United States Patent
Serkh

(10) Patent No.: US 6,758,778 B2
(45) Date of Patent: Jul. 6, 2004

(54) CVT BELT

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/072,762

(22) Filed: Feb. 7, 2002

(65) Prior Publication Data

US 2003/0148842 A1 Aug. 7, 2003

(51) Int. Cl.[7] .............................................. F16G 5/16
(52) U.S. Cl. ...................................... 474/242; 474/201
(58) Field of Search ................................ 474/201, 202, 474/237, 238, 242, 244, 245, 256, 257

(56) References Cited

U.S. PATENT DOCUMENTS

| | | | | |
|---|---|---|---|---|
| 4,484,903 A | * | 11/1984 | Schneider ................... | 474/242 |
| 4,498,892 A | * | 2/1985 | Huntley ..................... | 474/242 |
| 4,604,082 A | * | 8/1986 | Hattori ...................... | 474/242 |
| 4,676,768 A | * | 6/1987 | Miranti et al. ............... | 474/201 |
| 4,705,492 A | * | 11/1987 | Hattori et al. ................ | 474/49 |
| 4,824,424 A | * | 4/1989 | Ide et al. ..................... | 474/242 |
| 5,123,879 A | * | 6/1992 | Lecouturier et al. ......... | 474/242 |
| 5,236,401 A | * | 8/1993 | Matsuo ........................ | 474/242 |
| 5,776,023 A | | 7/1998 | Okawa et al. .............. | 474/243 |
| 6,110,065 A | | 8/2000 | Yagasaki et al. ............ | 474/244 |
| 6,123,637 A | | 9/2000 | Yagasaki ..................... | 474/242 |
| 6,217,472 B1 | | 4/2001 | Fujioka et al. .............. | 474/242 |
| 6,270,437 B1 | | 8/2001 | Yoshida et al. ............. | 474/248 |
| 6,273,837 B1 | | 8/2001 | Yoshida et al. ............. | 474/242 |
| 6,283,882 B1 | | 9/2001 | Nonaka et al. .............. | 474/242 |
| 6,293,886 B1 | | 9/2001 | Ohkawa et al. ............. | 474/242 |
| 6,306,055 B1 | | 10/2001 | Serkh .......................... | 474/242 |
| 6,334,830 B1 | | 1/2002 | Yagasaki et al. ............ | 474/242 |
| 6,336,884 B1 | | 1/2002 | Wakui et al. ................ | 474/245 |
| 6,379,275 B1 | * | 4/2002 | Serkh .......................... | 474/49 |
| 2002/0115513 A1 | * | 8/2002 | Yuan .......................... | 474/201 |

FOREIGN PATENT DOCUMENTS

| | | | | |
|---|---|---|---|---|
| DE | 24 14 989 | | 10/1975 | ............ F16G/5/18 |
| EP | 0 305 023 | | 3/1989 | ............ F16G/5/16 |
| EP | 1 094 242 | | 4/2001 | ............ F16G/5/16 |
| EP | 1 178 240 | | 2/2002 | ............ F16G/5/16 |
| GB | 2030263 | * | 4/1980 | ............ F16G/5/06 |
| JP | 62106147 | | 10/1987 | ............ F16G/5/16 |
| JP | 5272595 | * | 10/1993 | ........... B29D/29/10 |

* cited by examiner

Primary Examiner—David A. Bucci
Assistant Examiner—Vicky A. Johnson
(74) Attorney, Agent, or Firm—J. A. Thurnau, Esq.; C. H. Castleman, Esq.; S. S. Austin, Esq.

(57) ABSTRACT

The invention comprises a CVT belt having two multi-ribbed belts. Each belt is engaged in an opposing slot in a transversely mounted clip. Each belt is retained in each slot by a flat belt which is sandwiched into each slot with the multi-ribbed belt.

7 Claims, 4 Drawing Sheets

CVT BELT

FIELD OF THE INVENTION

The invention relates to a CVT belt comprising a multi-ribbed belt with transversely attached clips.

BACKGROUND OF THE INVENTION

Belts for continuously variable transmissions (CVT) generally comprise a plurality of members mounted transverse to an endless member. The belts must be configured in order for them to be "pushed" as well as "pulled" through a CVT pulley. That is, they must be capable of withstanding both compressive and tensile forces along a longitudinal axis of an endless member.

The endless member may comprise metal or elastomeric. In the prior art, the endless member generally comprises a form particularly suited to a CVT belt and as such has no industrial applicability other than in a CVT belt. This has the effect of making each CVT endless member costlier than other more readily available belt, such as multi-ribbed power transmission belt.

Another prior art belt includes a CVT belt comprising a core multi-ribbed belt to which transversely mounted clips are attached. The multi-ribbed belt is of a type that is otherwise useful in power transmission systems when not incorporated in a CVT belt.

Representative of the art is U.S. Pat. No. 6,306,055 to Serkh (2001) which discloses a core multi-ribbed belt having a plurality of clips arranged about said multi-ribbed belt.

The prior art multi-ribbed type belt also includes elastomeric bands which hold together the assembled belt. The belt is then engaged with a U-shaped slot between the elastomeric bands in each clip. Engaging the belt in such a manner renders the design susceptible to centripetal forces caused by operation of a system which includes the belt. Further, during operation each 'arm' of the U-shaped clip is subject to a bending moment as it moves between CVT pulleys. Such a bending condition represents a potential failure point.

What is needed is a belt comprising a multi-ribbed belt engaged with a slot disposed in transversely mounted clips. What is needed is a belt comprising two multi-ribbed belts each belt engaged with an opposing slot disposed in transversely mounted clips. The present invention meets these needs.

SUMMARY OF THE INVENTION

The primary aspect of the invention is to provide a belt comprising a multi-ribbed belt engaged with a slot disposed in transversely mounted clips.

Another aspect of the invention is to provide a belt comprising two multi-ribbed belts each belt engaged with an opposing slot disposed in transversely mounted clips.

Other aspects of the invention will be pointed out or made obvious by the following description of the invention and the accompanying drawings.

The invention comprises a CVT belt having two multi-ribbed belts. Each belt is engaged in an opposing slot in a transversely mounted clip. Each belt is retained in each slot by a flat belt which is sandwiched into each slot with the multi-ribbed belt.

DETAILED DESCRIPTION OF THE INVENTION

Figure 1:
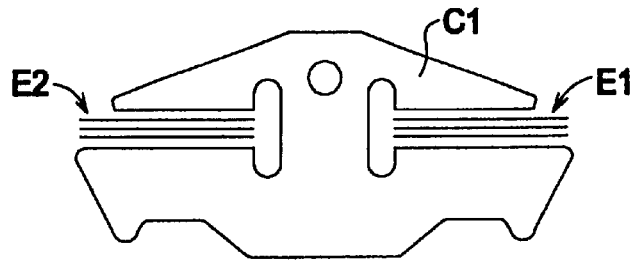
FIG. 1 is a view of a prior art CVT belt clip.

FIG. 1 is a view of a prior art CVT belt clip. Clip C1 is engaged with endless members E1 and E2. Endless members E1 and E2 comprise metallic material. Each member E1 and E2 comprise a series of parallel planes.

Figure 2:
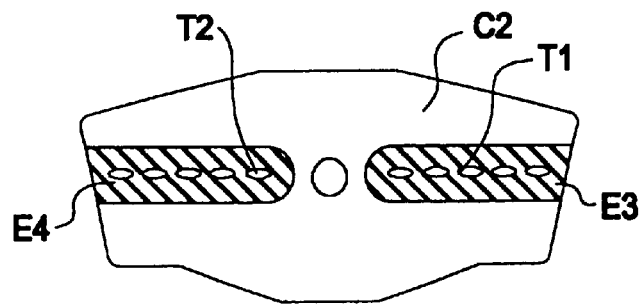
FIG. 2 is a view of a prior art CVT belt clip.

FIG. 2 is a view of a prior art CVT belt clip. Clip C2 is engaged with endless members E3 and E4. Endless members E3 and E4 comprise elastomeric material having tensile bands T1 and T2 embedded therein. Clips 2 may comprise either metallic or non-metallic material. Members E3 and E4 do not comprise a multi-ribbed profile.

Figure 3:
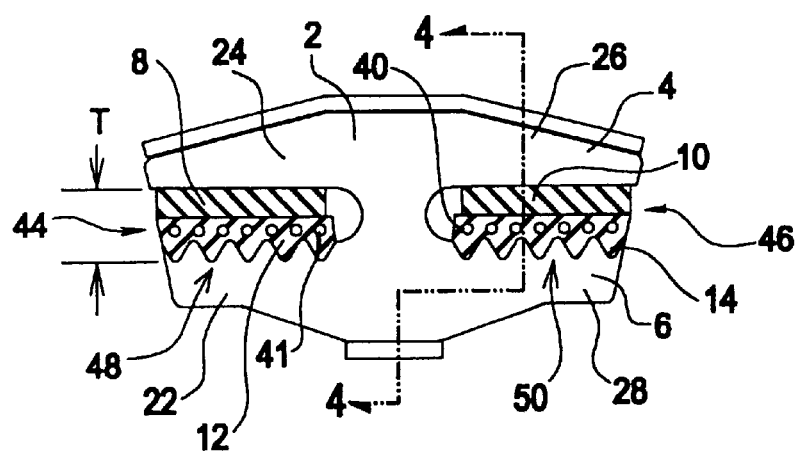
FIG. 3 front view of a clip of the inventive belt.

FIG. 3 front view of a clip of the inventive belt. The inventive belt comprises a plurality of clips 2. Each clip 2 is substantially planar and generally describes an "I" shape. The "I" shape of clip 2 assures that compressive forces created as the belt and clips pass through CVT pulleys will remain compressive and will not otherwise subject the clip to a bending moment. In the inventive belt a plurality of clips 2 are arranged in an adjacent parallel manner, see FIG. 5.

Tensile members 12, 14 each comprise a multi-ribbed belt. The ribs extend along a longitudinal axis of the belt. Tensile members 12, 14 also comprise tensile bands 40, 41 embedded therein. Tensile bands 40, 41 may comprise aramid, nylon 4.6, nylon 6.6, polyester, any combination thereof and their equivalents.

Spacer bands 8, 10 each engage clip 2 in slots 44, 46. A lower portion of each slot 44, 46 describe a multi-ribbed profile 48, 50 for cooperative engagement with a multi-ribbed belt 12, 14 respectively.

Figure 4:
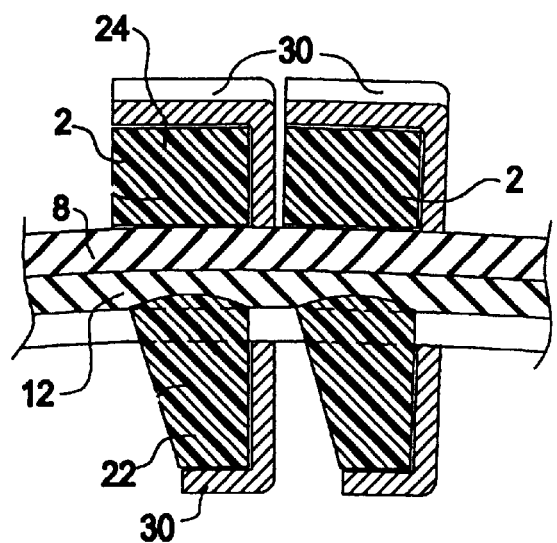
FIG. 4 is a side view of a portion of the inventive belt.

FIG. 4 is a side view of a portion of the inventive belt. Clips 2 each comprise arms 22, 24, 4, 6. Spacers 30 fill a space between clips 2 to assure proper engagement of the clip with members 10 (not shown) and 12.

Figure 5:
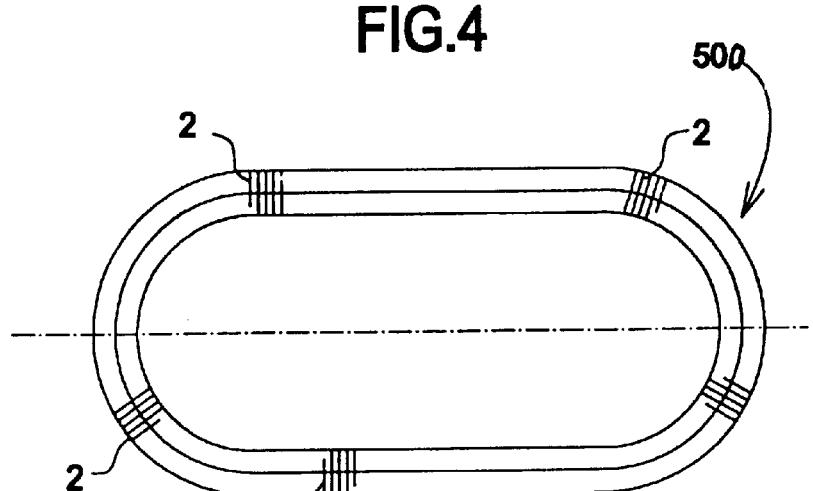
FIG. 5 is a side view of the inventive belt.

FIG. 5 is a side view of the inventive belt. Belt 500 comprises a plurality of clips 2 engaged with tensile members 12, 14 to form the endless inventive CVT belt.

Figure 6:
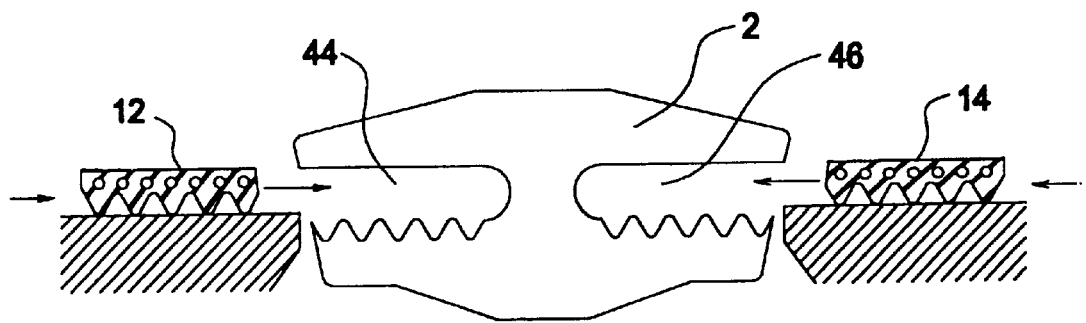
FIG. 6 is a side view of a step in the assembly of the inventive belt.

FIG. 6 is a side view of a step in the assembly of the inventive belt. A length of an inventive belt will be determined by the number of clips as well as by an overall length of the tensile members 12, 14. In order to install the tensile bands 12, 14 in a belt having a predetermined number of clips, each tensile band must be stretched slightly. For example, in the case of a belt shaving a length of 720–740 mm, tensile bands 12, 14 will be stretched 2–3 mm radially.

This means a stretch in belt length of 12–19 mm, which represents a stretch in the range of 1.6% to 2.6%. Belts having an elastic modulus in the range of approximately 1500 to 3000 N/mm are well suited for being stretched as described herein.

To assemble a belt, a sufficient number of clips are arranged in a final constructed from and then each tensile member 12, 14 is stretched and inserted into each slot 44, 46.

Another method of assembly also comprises beginning with a predetermined number of clips 2 from belt 500 initially arranged in an endless form.

Figure 9:
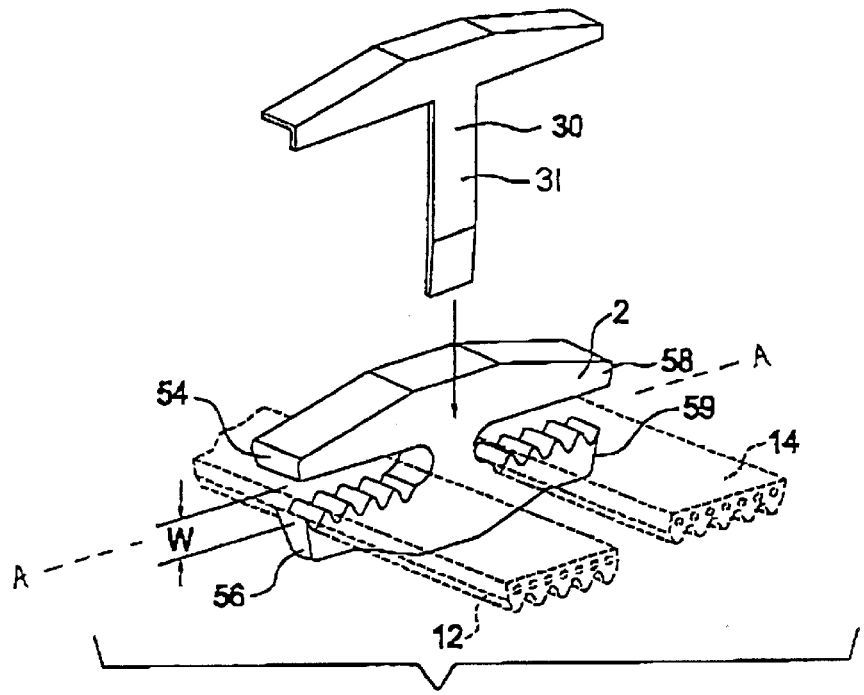
FIG. 9 is a perspective view of a clip in the inventive belt.
Figure 9A:
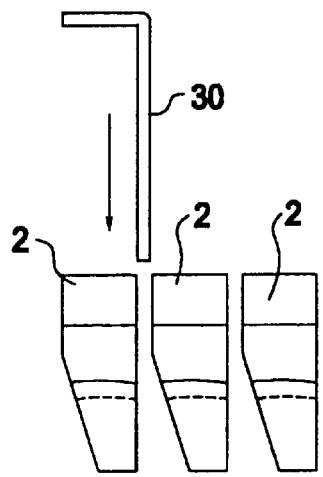
FIG. 9a is a side view of a portion of the inventive belt depicted in FIG. 9.
Figure 10:
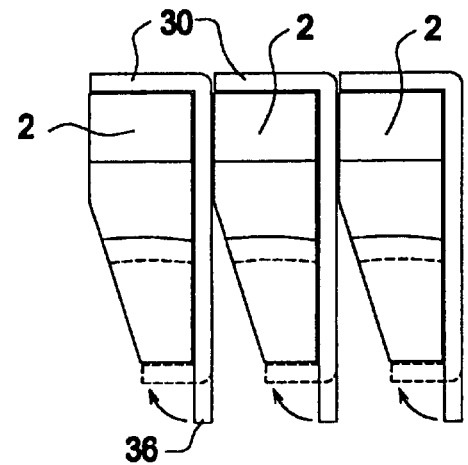
FIG. 10 is a side view of a portion of the inventive belt.

Once the remaining spacers are in place, a last compensating spacer 30 is inserted between two remaining clips 2 in order to remove any remaining clearance between each clip, see FIG. 9, FIG. 9a and FIG. 10. A spacer 30 locks each clip in place in the assembled belt. Spacers 30 cause a tight fit between each clip thereby enabling the desired pushing effect as the inventive belt operates.

Once tensile members 12, 14 are in place in slot 44, 46, then each of members 8, 10 are inserted into a respective slot space 60, 62. Members 8, 10 comprise elastomeric material such as natural rubbers, synthetic rubbers or any equivalent or combination thereof. A combined thickness T of member 8, 10 and member 12, 14 is greater than a width W of slot 44, 46 creating a compression of members 8, 10 and members 12, 14. This assures a proper engagement of member 12, 14 with a slot surface 48, 50 preventing a transverse movement of a tensile member relative to a clip.

Figure 7:
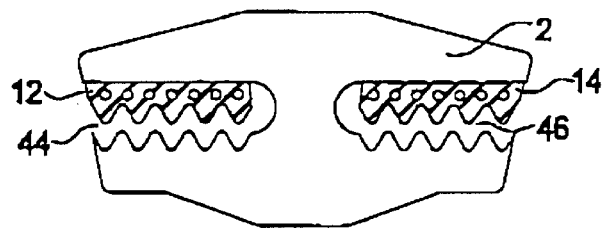
FIG. 7 is a side view of a step in the assembly of the inventive belt.

FIG. 7 is a side view of a step in the assembly of the inventive belt.

Figure 7A:
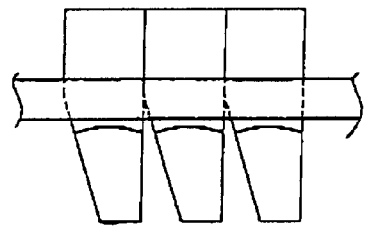
FIG. 7A is a side view to the view depicted in FIG. 7.

FIG. 7A is a side view to the view depicted in FIG. 7.

Figure 8:
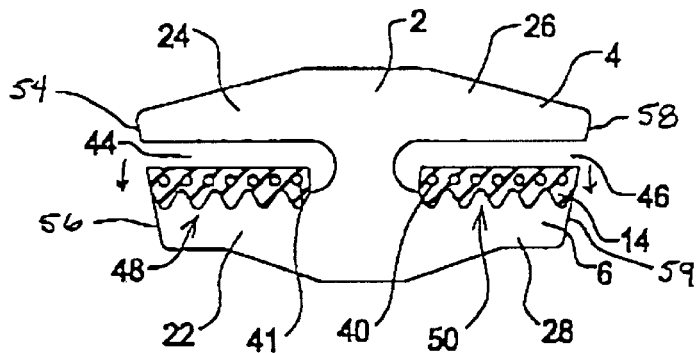
FIG. 8 is a side view of a step in the assembly of the inventive belt.

FIG. 8 is a side view of a step in the assembly of the inventive belt. Members 12, 14 are shown engaged with the multi-ribbed profile 48, 50 in the lower portion of slots 44, 46 of clip 2.

Figure 8A:
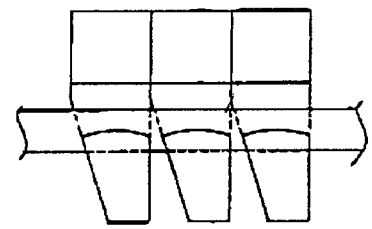
FIG. 8A is a side view to the view depicted in FIG. 8.

FIG. 8A is a side view to the view depicted in FIG. 8.

FIG. 9 is a perspective view of a clip in the inventive belt. Spacer 30 comprises a low friction material in order to facilitate a movement between adjacent clips 2. Arms 22, 24 each comprise inclined surfaces 54, 56, for engagement with a pulley or other driving surface (not shown). Arms 26, 28 each comprise inclined surfaces 58, 59, for engagement with a pulley or other driving surface (not shown). Spacer 30 is inserted between each clip 2 after members 12, 14 have been installed. Spacer 30 comprises portion 31 which extends between opposing slots 44, 46, and normally to an opposing slot axis A—A.

FIG. 9a is a side view of a portion of the inventive belt depicted in FIG. 9.

FIG. 10 is a side view of a portion of the inventive belt. End 36 is bent during assembly in order to clamp spacer 30 onto a clip 2.

Figure 11:
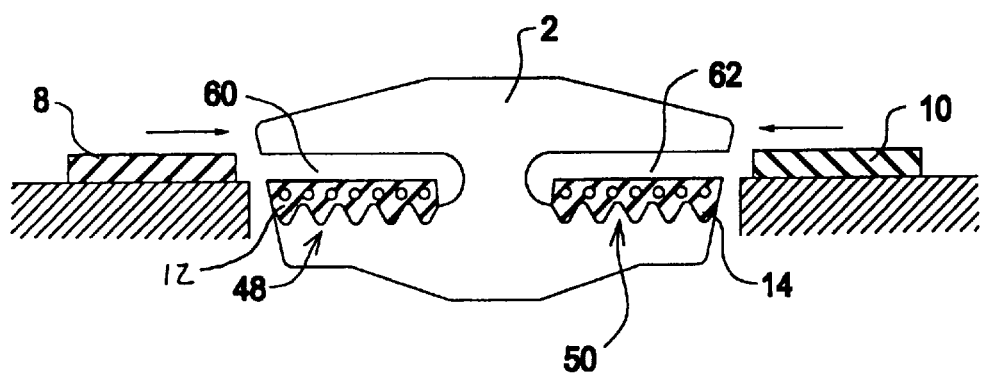
FIG. 11 is a side view of a step in the assembly of the inventive belt.

FIG. 11 is a side view of a step in the assembly of the inventive belt. Once members 12, 14 are in place, members 8, 10 are stretched slightly and transversely moved into slots 60, 62. Members 8, 10 comprise elastomeric material such as natural or synthetic rubbers, any combination thereof and their equivalents.

Although a form of the invention has been described herein, it will be obvious to those skilled in the art that variations may be made in the construction and relation of parts without departing from the spirit and scope of the invention described herein.

I claim:

1. A CVT belt comprising:

a plurality of adjacently disposed planar members, each having opposing slots, each opposing slot having a slot multiple-ribbed profile;

a tensile member having a multiple-ribbed profile extending in a longitudinal direction cooperatively engaged in each opposing slot with the slot multiple-ribbed profile;

a spacer band cooperatively engaged in each opposing slot with a tensile member, whereby the spacer band prevents a transverse movement of the tensile member; and a spacing member having a portion extending between the opposing slots, the spacing member disposed between adjacent planar members and having a bendable portion for retaining the spacing member on the planar member.

2. The CVT belt as in claim 1, wherein the planar members further comprise arms with the opposing slots disposed between the arms.

3. The CVT belt as in claim 2, wherein each of the arms further comprise an inclined surface for engaging a pulley.

4. The CVT belt as in claim 1, wherein the spacing member comprises a low friction material.

5. The belt as in claim 1, wherein each tensile meter has an elastic modulus in the range of approximately 1500 to 3000 N/mm.

6. The belt as in claim 1, wherein a combined thickness (T) of the tensile member and the spacer band is greater than a width (W) of an opposing slot.

7. The belt as in claim 1, wherein the spacing member portion extends normally to an opposing slot axis.

* * * * *